3,371,760
COORDINATED MECHANISM
Jasper Willsea, 430 Lake Road, Webster, N.Y. 14580; Norma Julia Willsea, executrix of said Jasper Willsea, deceased
Original application July 15, 1963, Ser. No. 294,862. Divided and this application Oct. 21, 1966, Ser. No. 591,943
5 Claims. (Cl. 192—142)

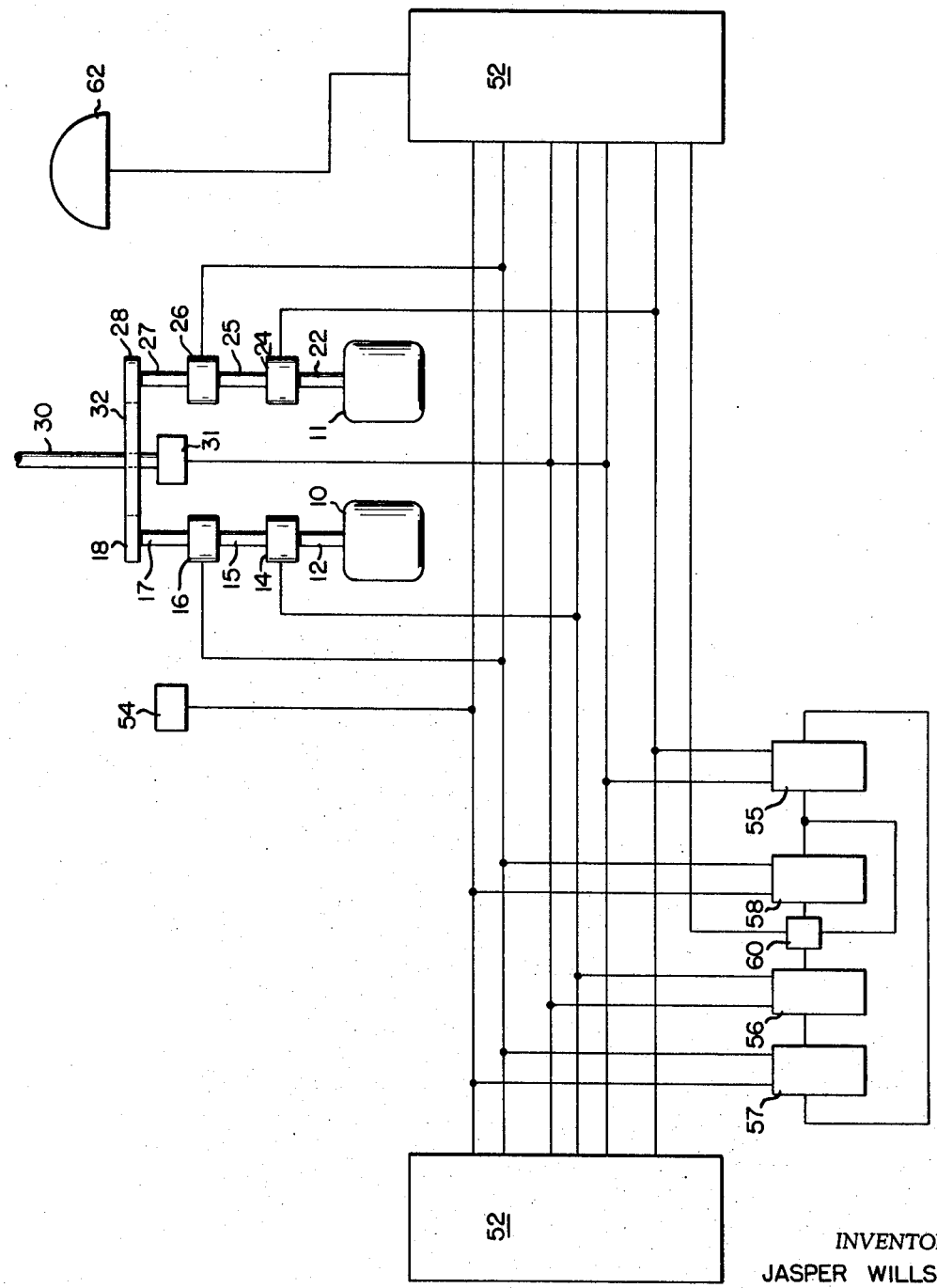

---

ABSTRACT OF THE DISCLOSURE

A coordinated mechanism that is controlled numerically and is entirely electrical. The extent of a movement or a dwell is controlled by counting precise displacement units. Pulses representing the units are counted. When the counted units are equal to the preset number of the desired extent, the movement or dwell is switched off and another movement or dwell is switched on. Displacement units are transduced during a movement from a driven shaft, and during a dwell from a block shaft.

A programming by a sequence of preset count numbers in count-switches can be modified instantly by a resetting of the preset count number in the respective count-switch during an operation and without any mechanical adjustment. A preset count number in a count-switch can be reset from an external remote source.

---

This application is a divisional of my copending parent application Ser. No. 294,862 filed July 15, 1963. Another divisional of the same parent application is being filed concurrently herewith.

This invention relates to control. More particularly, this invention relates to coordinating the control for a sequence of mechanical movements and dwells.

Human effort often is concentrated on locating workpieces from machine to machine.

My U.S. Patent 2,959,301, granted Nov. 8, 1960, disclosed a machine that would perform some of the functions of a human worker in hand-arm and body movements.

However, the control of the machine was electromechanical. The control devices included the usual adjustable limit switches that require a physical contact in order to start and stop a movement. A prearranged cycle of movements were provided by rotary cams and electromechanical switches for each movement of each respective part.

My present control of the extent of a movement is by counting precise units of the actual displacement. Pulses representing the increments of the displacement units are used in such counting.

Displacement increment pulses are counted until their number equals the preset count number of the desired increments. This equality causes a switching to stop the movement and to start another movement in a circuit with its own count-switch that includes another preset count number.

My control of the increments of a dwell is by counting precise units of displacement of a clock shaft. Pulses representing the clock shaft displacement units are increments used also in counting.

Clock shaft increment pulses are counted until their number equals the preset count number of the desired increments of the dwell. This equality causes a switching to stop the dwell and to start a movement in another circuit with its own count-switch that includes another preset count number.

Each movement and dwell is systematically coordinated by its preset count number as a precisely counted interval between other intervals wherein each succeeding interval is begun by switching from a counted preceding interval.

Hence, any sequence of intervals, whether space or time, are expressed as a sequence of numbers, and coordination is effected by presetting each number in its respective count-switch. The actual counting of the space or time increment units will stop a movement or a dwell where and when the counting equals the preset number.

Where an increment unit of a movement is $1/64$ of an inch, an extent of a movement of one inch would be expressed by the number 64 to represent the sixty-four $1/64$. In the same manner, a dwell of one minute would be expressed by the number 60 when the increment units of the clock shaft each corresponded to a second of time.

My movements stop themselves according to their preset count number in each respective count-switch of a sequence. My movements start at the stop of a respective preceding movement. My movements can be changed precisely during operation.

The usual limit switches start and stop each movement within limits that must be contacted physically and any adjustment of a program would require a mechanical adjustment while the mechanism is not operating.

Hence, an object of the present invention is to provide a systematic organization for the coordination of the increments of the movements and the increments of the dwells of a mechanism that is entirely electrical rather than electromechanical.

The drawings illustrate a simple coordinated mechanism. However, the invention is applicable to different and more complicated controls such as one or more of the transfer mechanisms illustrated in my earlier-mentioned patent, No. Re. 25,889.

The drawing shows a schematic block diagram of a simple embodiment of this invention. The numerals 10 and 11 denote two motors that are mounted side by side and that operate continuously and in opposite respective directions. Between the shaft 12 of the motor 10 and driven shaft 15 is an electromagnetic clutch 14 mounted on one end of the driven shaft 15. An electromagnetic brake 16 is mounted on the driven shaft 15, axially spaced along the shaft from the clutch. The driven shaft 15 has an extension 17 that projects beyond the brake 16, and a gear 18 is mounted on the end of the shaft extension 17.

Similarly, the motor shaft 22 of the motor 11 is connected to one side of an electromagnetic clutch 24, from the other side of which a driven shaft 25 projects. An electromagnetic brake 26 is mounted on the driven shaft 25, and a gear 28 is mounted on the end of an extension 27 of the shaft 25.

Details of a preferred arrangement for electromagnetic clutches 14 and 24 and brakes 16 and 26 are shown in my copending divisional application filed concurrently herewith.

A shaft 30 is mounted intermediate the shaft extensions 17 and 27 respectively. A displacement unit pulse transducer 31 is mounted on the end of the shaft 30. A pinion 32 is secured on the shaft 30, and is engaged with the gears 18 and 28.

To drive the shaft 30 in one direction, which can be arbitrarily designated as the forward direction, the clutch 14 is energized. The shaft 15 is thereby driven in the same direction as the motor drive shaft 12, and its rotary movement is transmitted through the shaft extension 17, the gear 18, and the pinion 32, to drive the shaft 30 in the forward direction.

The rotary movement of pinion 32 is also transmitted through the gear 28, and to the shaft extension 27 and the shaft 25. To change the direction of rotation of the shaft 30, the clutch 14 is de-energized, and clutch 24 is energized. The brakes 16 and 26 are used ot hold a motionless dwell intervals in the shaft 30.

The system illustrated includes a displacement unit pulse transducer 31, which for example is an angular transducer. This device is available commercially. It transmits a pulse for each increment of angular displacement of the driven shaft 30.

A time unit pulse transducer 54 is an angular transducer that is mounted on a clock shaft. It transmits a pulse for each increment of angular displacement of the clock shaft that is included in 54, and thereby transmits temporally uniformly spaced pulses.

The drawing shows one example of how a sequence of count-switches can be arranged to illustrate a simple embodiment of the invention in which one driven shaft is under control. Of course, my invention is not limited as to the number and variety of count-switches and driven shafts that can be incorporated in a coordinated mechanism according to this invention. In the simple embodiment shown there is a simple program for a backward movement, a dwell, a forward movement, and another dwell that completes the sequence.

The clutches 14, 24 and brakes 16, 26 are controlled by count-switches 55, 56, 57 and 58, and also by computers 52 and 52', as indicated schematically.

Count-switch 55 is wired both to backward movement clutch 24 for coupling a backward movement, and also to transducer 31 for counting the displacement unit pulses therefrom until the counting equals the preset count number in 55. At the equal counting, the counter-switch 55 will act as a two-way switch and it will switch off the wiring above and switch on the wiring of the count-switch 57 by a wire connecting 55 to 57.

Count-switch 57 is wired to brakes 16 and 26 to hold a dwell interval in shaft 30. Count-switch 57 also is wired to transducer 54 for counting the clock displacement on time unit pulses therefrom until the counting equals the preset count number in 57. At the equal counting, the count-switch 57 will act as a two-way switch and it will switch off the wiring above and switch on the wiring of the count-switch 56 by a connecting wire from 57 to 56.

Count-switch 56 is wired both to forward movement clutch 14 for coupling a forward movement and also to transducer 31 for counting the displacement unit pulses therefrom until the counting equals the preset count number in 56. At the equal counting, the count-switch 56 will act as a two-way switch and it will switch off the wiring above and switch on the wiring of the count-switch 58 by a connecting wire from 56 to 58.

Count-switch 58 is wired to brakes 16 and 26 to hold a dwell interval in shaft 30. Count-switch 58 also is wired to transducer 54 for counting the clock displacement or time units therefrom until the counting equals the preset count number in 58. At the equal counting, the count-switch 58 will act as a two-way switch and it will switch off the above wiring and switch on the wiring of the count-switch 55 by a connecting wire from 58 to 55.

Count-switch 55 is the control of the first interval of the above described sequence that would start a repetition of the sequence automatically because the connecting wire from count-switch 58 at the end of the sequence is connected to the count-switch 55 at the beginning, and thereby repeating the sequence indefinitely so long as the power is on. Those skilled in the art refer to such a wired repetition as a closed loop.

Computer 52 can have a preset count number for the repetitions of the sequence so that when the equaling sequence is counted the power is switched off to stop the mechanism. The clock increment units transducer 54 is supplied with power independently of the mechanism and can still be transmitting pulses for this dwell. A preset count number in the computer for this dwell can cause the computer to switch on the power for the mechanism when the pulses count was equal to the preset count number of the desired extent of the dwell.

Computer 52' is wired to a sensor 62 wherefrom pulses corresponding to a sensed condition can cause the computer 52' to compute a modification of a movement or a dwell. The solution of the computing would be in pulses to reset the preset count number in the respective count-switch for the modification to meet the sensed condition.

Computer 52' also is wired to a two-way switch 60 to switch a by-pass or to restore count-switch 58 as a control in the sequence. Switch 60 is actuated when from a condition sensed by 62, computer 52' computes that the dwell controlled by 58 should be by-passed and eliminated, or restored. By this interruption of a single count-switch my coordinating mechanism is subject to remote external elimination of an entire movement or dwell as well as a modification by a resetting of a count number in a count-switch.

As system that is constructed in accordance with this invention can coordinate movements and dwells in accordance with precisely counted accurate units of desired extents. No mechanical means are required either to control or modify a movement or a dwell by a physical contact. Hence, any movement or dwell can be modified at any time, and particularly while the mechanism is in operation.

All of the components are commercially available so that anyone skilled in the art of control wiring could arrange the illustrated device or much more elaborate coordination within the spirit of the invention and the scope of the appended claims.

I claim:
1. A coordinated mechanism comprising:
   (a) a movable member;
   (b) drive means for moivng said member;
   (c) electric means for controlling said drive means and the movement of said member thereby;
   (d) means for producing an electric pulse for each increment of displacement of said member;
   (e) means for counting said displacement pulses;
   (f) means for presetting said displacement pulse counter to produce an output upon receiving a predetermined number of said displacement pulses;
   (g) switch means actuated by said output from said displacement pulse counter for switching said drive controlling means to stop movement of said member and start a succeeding dwell or movement;
   (h) means for producing electric pulses at a preselected regular time interval;
   (i) means for counting said time interval pulses;
   (j) means for presetting said time interval pulse counter to produce an output upon receiving a predetermined number of said time interval pulses; and
   (k) switch means actuated by said output from said time interval pulse counter for switching said drive controlling means to stop a dwell of said member and start a succeeding dwell or movement.

2. The coordinated mechanism of claim 1 including means for sensing the environment of said member, and means in circuit with at least one of said counting means for resetting said counting means to change the value of said predetermined number in response to said sensing means.

3. The coordinated mechanism of claim 1 wherein said drive means includes both forward and reverse drive means for said member, and wherein said drive controlling means comprises an electromagnetic clutch for each of said forward and reverse drive means.

4. The coordinated mechanism of claim 3 wherein said drive controlling means includes an electromagnetic brake arranged to arrest the movement of said member upon actuation and said switch means are arranged for energizing and de-energizing said brake.

5. The coordinated mechanism of claim 4 wherein said forward drive means comprises a motor for rotating said member in a forward direction, said reverse drive means comprises a motor for rotating said member in a reverse direction, and said electromagnetic clutch and said electromagnetic brake are each interposed between said forward drive motor and said member and said reverse drive motor and said member.

References Cited

UNITED STATES PATENTS

| | | | |
|---|---|---|---|
| 2,806,571 | 9/1957 | Zeldman | 192—142 |
| 2,818,150 | 12/1957 | Eck et al. | 192—144 |
| 2,887,638 | 5/1959 | Cail et al. | |
| 2,909,259 | 10/1959 | Diener | 192—12.2 X |

DONLEY J. STOCKING, *Primary Examiner.*

ARTHUR T. McKEON, *Examiner.*